United States Patent
Hanada et al.

(10) Patent No.: US 11,903,061 B2
(45) Date of Patent: Feb. 13, 2024

(54) COMMUNICATION DEVICE, CONNECTION CONTROL METHOD AND RECORDING MEDIUM

(71) Applicant: CASIO COMPUTER CO., LTD., Tokyo (JP)

(72) Inventors: Takeshi Hanada, Tachikawa (JP); Haruo Kajitani, Akiruno (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 154 days.

(21) Appl. No.: 17/191,899

(22) Filed: Mar. 4, 2021

(65) Prior Publication Data
US 2021/0282208 A1    Sep. 9, 2021

(30) Foreign Application Priority Data
Mar. 5, 2020   (JP) ................................. 2020-037415

(51) Int. Cl.
   *H04W 76/15*   (2018.01)
(52) U.S. Cl.
   CPC .................. *H04W 76/15* (2018.02)
(58) Field of Classification Search
   CPC ......... H04W 4/80; H04W 4/06; H04W 76/40; H04W 76/14; H04W 76/15; H04W 84/18; Y02D 30/70; H04B 5/02
   See application file for complete search history.

(56) References Cited

U.S. PATENT DOCUMENTS

| | | | |
|---|---|---|---|
| 9,258,527 B2* | 2/2016 | Card, II | H04N 21/6143 |
| 2013/0219381 A1* | 8/2013 | Lovitt | G06F 8/65 |
| | | | 717/173 |
| 2015/0312703 A1* | 10/2015 | Maldari | H04W 8/005 |
| | | | 455/41.2 |
| 2016/0246264 A1* | 8/2016 | Nagareda | G04R 20/30 |
| 2016/0262151 A1* | 9/2016 | Chongoushian | H04L 27/10 |
| 2017/0230692 A1* | 8/2017 | Nakashima | H04N 21/21805 |
| 2017/0245145 A1* | 8/2017 | Choi | H04L 63/0861 |

(Continued)

FOREIGN PATENT DOCUMENTS

| | | |
|---|---|---|
| CN | 101233786 A | 7/2008 |
| JP | 2011-72003 A | 4/2011 |

(Continued)

OTHER PUBLICATIONS

Notice of Reasons for Refusal dated Apr. 5, 2022 received in Japanese Patent Application No. JP 2020-037415 together with an English language translation.

(Continued)

*Primary Examiner* — Cindy Trandai
(74) *Attorney, Agent, or Firm* — Scully, Scott, Murphy & Presser, P.C.

(57) ABSTRACT

A communication device includes a communicator and a processor. The communicator communicates with external devices. The processor controls connection. While at least one of the external devices is assigned to a main external device which is a main connection target, the processor switches between a first period and a second period. The first period is a period to allow communication with an auxiliary external device which is not the main external device. The second period is a period not to allow communication with the auxiliary external device.

17 Claims, 4 Drawing Sheets

(56) References Cited

U.S. PATENT DOCUMENTS

| | | | |
|---|---|---|---|
| 2017/0272270 A1* | 9/2017 | Gu | H04B 17/318 |
| 2019/0080127 A1* | 3/2019 | Yoshida | G06F 3/04162 |
| 2020/0007331 A1* | 1/2020 | Wentz | G06F 1/14 |

FOREIGN PATENT DOCUMENTS

| | | |
|---|---|---|
| JP | 2013-215001 A | 10/2013 |
| JP | 2015-122695 A | 7/2015 |
| JP | 2018-129642 A | 8/2018 |
| JP | 2019-047343 A | 3/2019 |

OTHER PUBLICATIONS

First Office Action dated Jan. 18, 2022 received in Chinese Patent Application No. Cn 202110235752.6 together with an English language translation.

* cited by examiner

| IDENTIFICATION INFORMATION | MAIN TARGET | LATEST CONNECTION DATE AND TIME (UTC) | DATE AND TIME UPDATE |
|---|---|---|---|
| 0x123456789abc | 1 | 2020-02-12 21:34:56 | 0 |
| 0x123456789fed | 0 | 2020-02-12 06:51:02 | 0 |
| 0x1278de02468a | 0 | 2020-02-12 06:51:05 | 0 |
| 0x1278de048c15 | 0 | 2020-02-12 07:01:02 | 0 |

COMMUNICATION DEVICE, CONNECTION CONTROL METHOD AND RECORDING MEDIUM

CROSS REFERENCE TO RELATED APPLICATION

This application is based upon and claims the benefit of priority under 35 USC 119 of Japanese Patent Application 2020-037415 filed on Mar. 5 2020, the entire disclosure of which, including the description, claims, drawings, and abstract, is incorporated herein by reference in its entirety.

BACKGROUND OF THE INVENTION

1. Field of the Invention

The present invention relates to a communication device, a connection control method and a recording medium.

2. Description of Related Art

In a known technique of transmitting and receiving information, a terminal such as a portable small device or measuring device is connected to an electronic device that serves as a server by short-range wireless communication. Some electronic devices simultaneously connect to each of the terminals separately.

Some of terminals may be used for the same purpose. In that case, sending and receiving the same information to and from all of those terminals often waste resources and power. In JP2011-72003A, a priority list for connection with a plurality of terminals is registered. A terminal to be connected is selected based on the priority list.

SUMMARY OF THE INVENTION

To achieve at least one of the abovementioned objects, according to an aspect of the present invention, a communication device includes:
  a communicator that communicates with external devices; and
  a processor that controls connection,
  wherein, while at least one of the external devices is assigned to a main external device which is a main connection target, the processor switches between:
    a first period to allow communication with an auxiliary external device which is not the main external device; and
    a second period not to allow communication with the auxiliary external device.

BRIEF DESCRIPTION OF THE DRAWINGS

The advantages and features provided by one or more embodiments of the invention will become more fully understood from the detailed description given hereinbelow and the appended drawings which are given byway of illustration only, and thus are not intended as a definition of the limits of the present invention.

DETAILED DESCRIPTION OF THE PREFERRED EMBODIMENT

An embodiment of the invention will be described with reference to the drawings. However, the scope of the invention is not limited to the disclosed embodiments.

Figure 1:
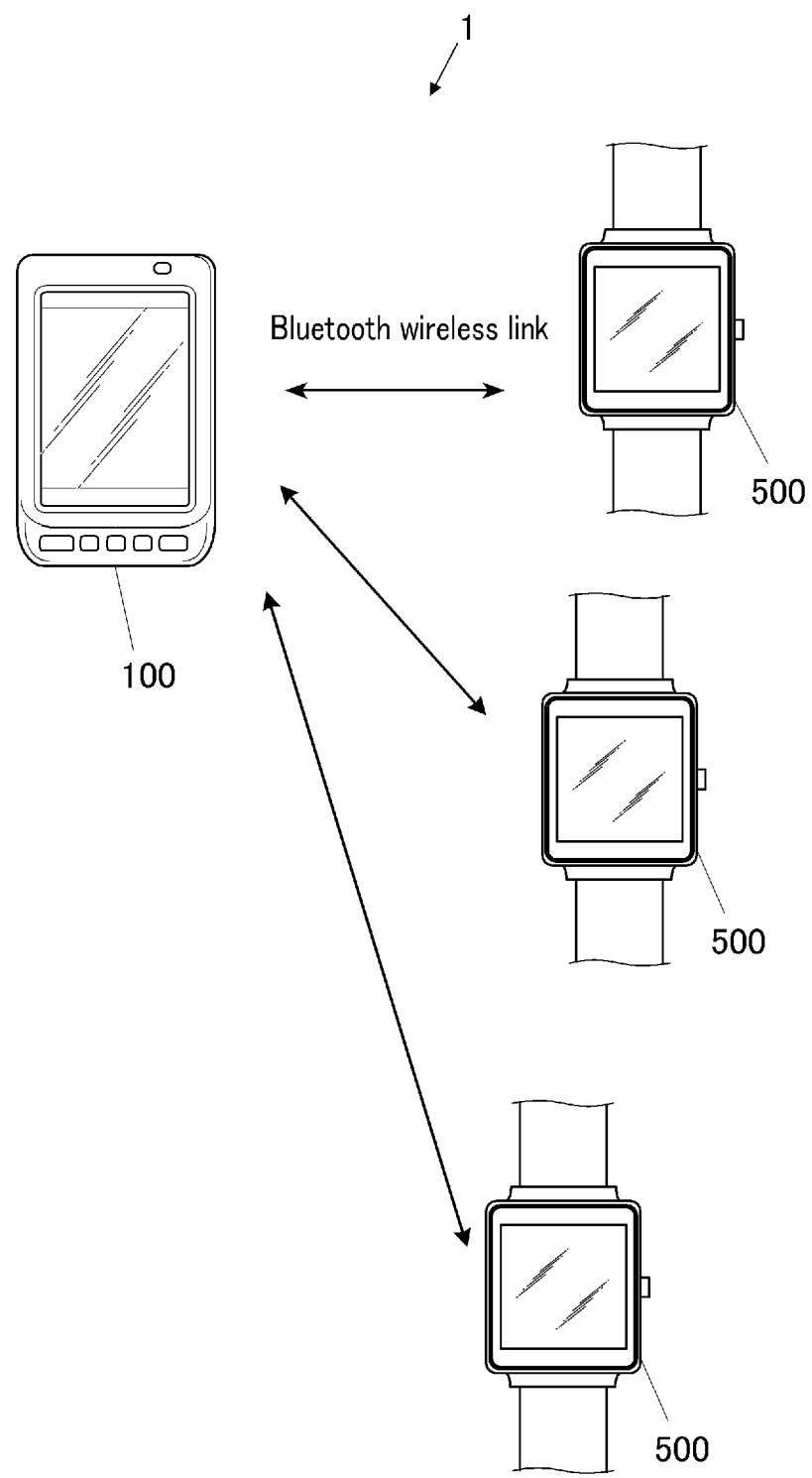
FIG. 1 shows configuration of a communications system according to an embodiment.

FIG. 1 shows configuration of a communication system 1 according to the embodiment.

The communication system 1 includes one electronic device 100 (communication device) and a plurality of terminals 500 (external devices).

The electronic device 100 is, for example, a smartphone. The electronic device 100 displays various digital contents and accepts input operations. The terminal 500 is, for example, an electronic watch.

The terminal 500 includes a communicator. A communication standard for communication of the communicator may be the one same as that for the electronic device 100 and is, for example, Bluetooth (registered trademark). All the terminals 500 on a terminal side (slaves and peripherals) are connected to the electronic device 100. The electronic device 100 simultaneously communicates with the terminals 500. An example of Bluetooth used in the embodiment is Bluetooth Low Energy (BLE). Alternatively, Bluetooth may be conventional Bluetooth Basic Rate (BR) or Enhanced Data Rate (EDR) (collectively referred to as Bluetooth Classic or BC).

Figure 2:
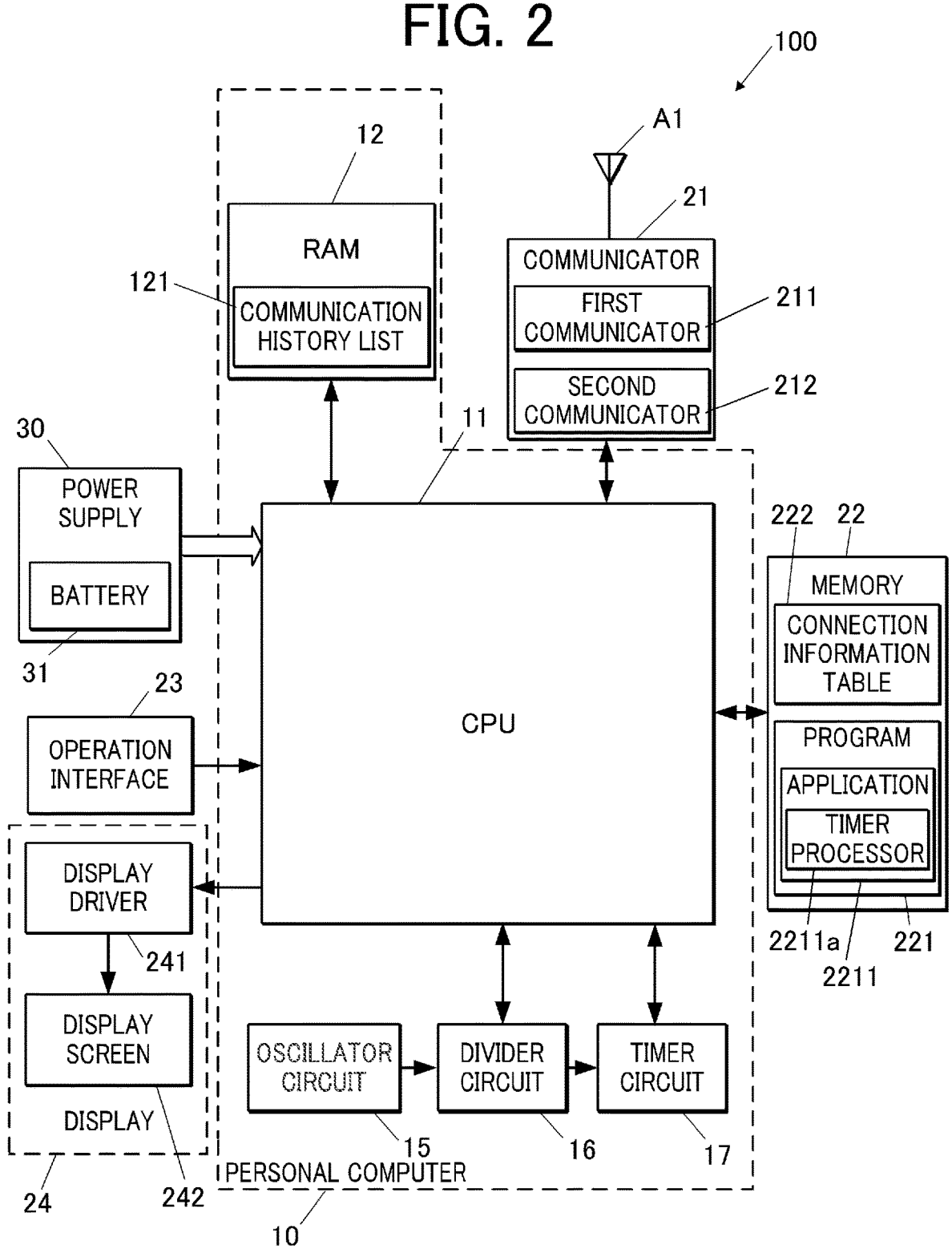
FIG. 2 is a block diagram illustrating functional configuration of an electronic device.

FIG. 2 is a block diagram illustrating functional configuration of the electronic device 100.

The electronic device 100 includes a CPU (Central Processing Unit) 11 (controller), a RAM (Random Access Memory) 12, an oscillator circuit 15, a divider circuit 16, a timer circuit 17, a communicator 21, a memory 22, an operation interface 23, a display 24, and a power supply 30.

The CPU 11 is a processor that comprehensively controls all the operations of the electronic device 100. The CPU 11 performs various arithmetic processing to perform control operation.

The control operation includes:
  controlling various displays performed by the display 24, such as a date and time based on those counted by the timer circuit 17; and
  controlling setting of whether to allow communication with the terminal 500.

The CPU 11 may be a single processor. Alternatively, the CPU 11 may include a plurality of processors for distributed processing.

The RAM 12 provides the CPU 11 with working memory space and stores temporary data. The RAM 12 includes, for example, a DRAM, and may also include a rewritable nonvolatile memory.

The RAM 12 stores a connection history list 121. The connection history list 121 includes a list of the latest time points of connection with the terminals 500 which are subjects of connection in short-range wireless communication by the communicator 21. Setting data indicating that it is a main connection target may be given to an external device of the main connection target (main external device) among the terminals 500. The main external device is capable of communication of priority as well as communication in any period, such as always-on connection.

Each of auxiliary external devices which are the external devices other than at least the main external device stores:

a setting flag that indicates whether communication is allowed;

a flag that indicates whether connection is made after a date and time of the electronic device 100 are updated; and the latest (most recent) time point at which the external device is connected with the electronic device 100.

Figures 3, 4:
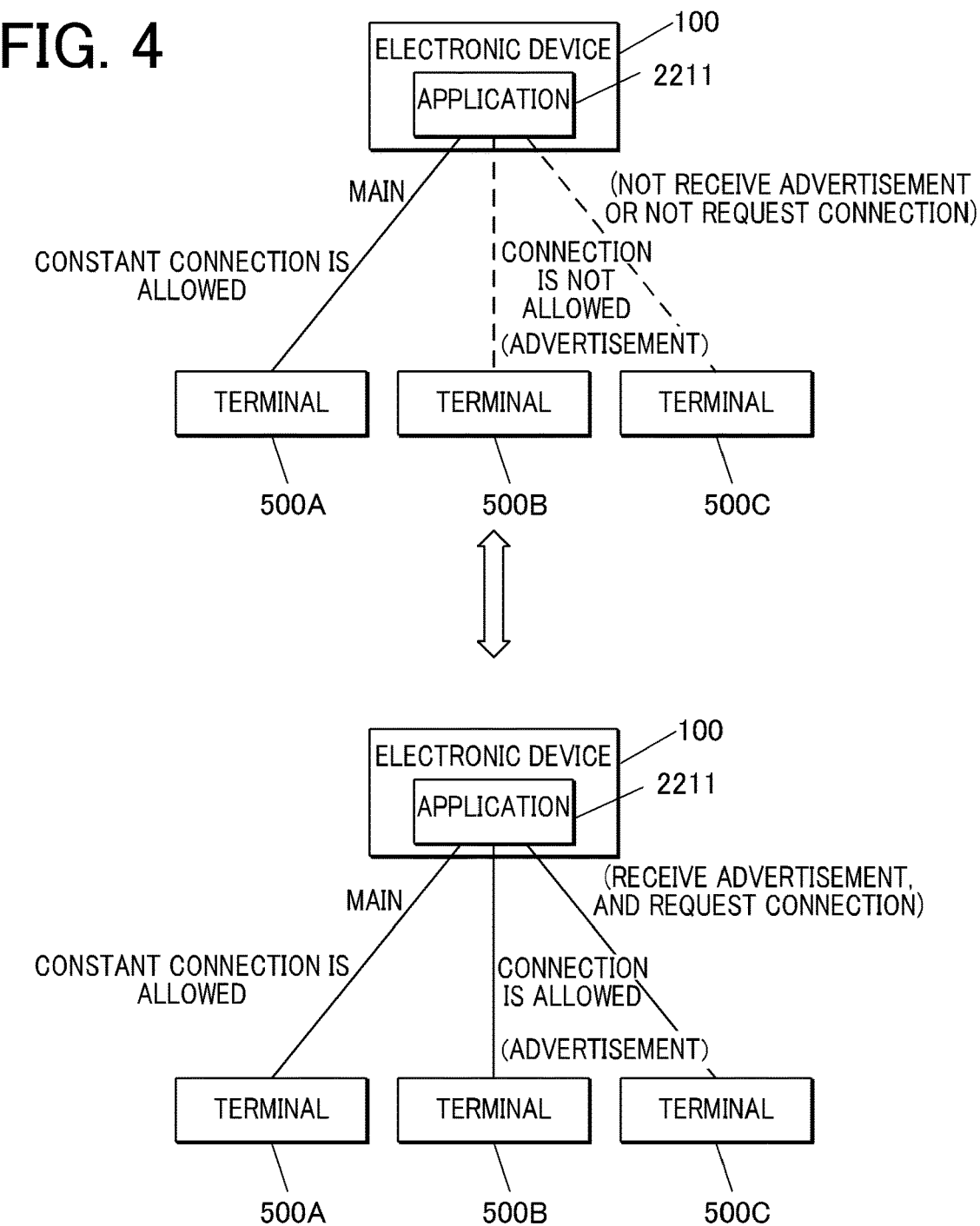
FIG. 3 is a table showing an example of a communication history list.
FIG. 4 illustrates connection with the electronic device.

FIG. 3 is a table showing an example of a connection history list 121.

Each of identification information, such as BD address, of a paired communication device is stored in relation to:

a flag that indicates whether the terminal 500 is the main connection target (in the embodiment, the main connection target is set to "1");

data of the latest connection date and time; and a date and time update flag.

All the date and time update flags are set together (in the embodiment, they are set to "1") when the current date and time counted by the electronic device 100 is updated (including start and end of daylight saving time, and change in the time zone). After this, the electronic device 100 communicates with the terminals 500 to transmit the current date and time to the terminals 500. Then, the date and time update flags for the terminals 500 are reset one by one (in the embodiment, they are set to "0"). Thus, even if the current date and time are transmitted to one terminal 500 (the first auxiliary external device among the auxiliary external devices) and the date and time update flag is reset, the date and time update flags for other terminals 500 (the auxiliary external devices other than the first auxiliary external device) to which the current date and time are not transmitted remain set.

The above data may not be stored in the connection history list 121 for all the paired terminals 500. The above data may be stored only for the terminals 500 on which connection control processing described later is performed with an application program.

The oscillator circuit 15 generates and outputs a signal (clock signal) of a predetermined frequency. For example, a crystal oscillator or a MEMS oscillator (Micro Electro-Mechanical Systems) is used for generating a clock signal. The divider circuit 16 outputs a divided signal obtained by dividing the clock signal input from the oscillator circuit 15 in a set division ratio. The CPU 11 may change the setting of division ratio.

The timer circuit 17 counts the current date and time (at least the current time) by counting pulse signals of a certain frequency (which may be the same frequency as that of the clock signal) input from the divider circuit 16, and holds them. The counted date and time may be local time in the time zone corresponding to the current location of the electronic device 100. The CPU 11 can modify the date and time counted by timer circuit 17 based on current date and time information which is retrieved by the communicator 21 from an electronic device such as an external host server. The electronic device 100 may have a configuration for satellite positioning to receive radio waves from a positioning satellite to determine the current position. Alternatively, the electronic device 100 may obtain current location information sufficient for identifying the time zone from a telephone communication base station or the like.

The CPU 11, the RAM 12, the oscillator circuit 15, the divider circuit 16, and the timer circuit 17 are included in a personal computer 10. The RAM 12, the oscillator circuit 15 (especially the oscillator) and the like may be external to the personal computer 10.

The communicator 21 controls transmission and reception of radio waves and processing of data in communication with external electronic devices via an antenna Al based on a communication standard. The communicator 21 includes a first communicator 211 and a second communicator 212. The first communicator 211 communicates with the terminal 500 in Bluetooth. The second communicator 212 performs data communication (packet communication) through the Internet or a wireless LAN (Local Area Network) via a router. The communicator 21 may further include a configuration for telephone communication.

The memory 22 stores programs 221 and setting data for various kinds of control. The memory 22 is, for example, a non-volatile memory such as a flash memory. The program 221 includes an application 2211 that controls connection with the terminals 500. The application 2211 may be downloaded from, for example, an external server device through the Internet and the second communicator 212, for installation. The application 2211 may include a timer processor 2211a (timer). The timer processor 2211a is a program for counting the current date and time (current time) with accuracy higher than that of the timer circuit 17 after the application 2211 is started. The timer processor 2211a may acquire accurate current date and time data from an external time server or the like through the second communicator 212. In that case, the current date and time transmitted to the terminals 500 may be a date and time counted by the timer processor 2211a.

The memory 22 stores the connection information table 222 as setting data. The connection information table 222 includes table data of identification information and setting information (pairing data and bonding data; hereinafter, pairing and bonding together are referred to as "pairing") of external electronic devices. The identification information and the setting information are used in communication with external electronic devices including the terminals 500 via the communicator 21. The pairing data includes, for example, data of a private key for connection, and information of operation intervals in connection.

The operation interface 23 accepts input operation from outside, such as user operation. The operation interface 23 includes a touch panel superimposed on the display screen 242, and outputs information on a position and time length of touch operation as operation signals to the CPU 11. The operation interface 23 may include a push button switch or a rotation switch.

The display 24 displays various kinds of information based on control of the CPU 11. The display 24 includes a display driver 241 and a display screen 242. The display screen 242 performs digital display and is, for example, a liquid crystal display screen (LCD) of a dot matrix type. The display driver 241 outputs a drive signal that makes the display screen 242 perform display to the display screen 242 based on a control signal from the CPU 11. The display 24 may include an LED lamp for notification.

The power supply 30 supplies power from the battery 31 to parts of the electronic device 100, such as the personal computer 10, at a predetermined driving voltage. In the embodiment, the electronic device 100 includes a battery 31 which is, for example, a rechargeable battery which is connected to an external power source to be charged. Alternatively, a replaceable dry battery, rechargeable battery, etc. may be used.

Bluetooth communication control in the electronic device 100 according to the embodiment will be described.

FIG. 4 illustrates connection with the electronic device 100.

The electronic device 100 is paired with the terminals 500 to control connection with the terminals 500 via the application 2211. Whether it is the main connection target is set for each terminal 500. In the embodiment, at least one terminal 500 is set to the main connection target. The upper limit (e.g., one) of the number of terminals 500 of the main connection target may be or may not be set. In the embodiment, one terminal 500A is set to the main connection target. In a case in which a Bluetooth advertisement is received from the terminal 500A which is the main connection target, the electronic device 100 always allows communication and transmits a connection request to establish connection.

On the other hand, while the terminal 500 of the main connection target is set as described above, in a case in which advertisements are received from auxiliary terminals 500B, 500C (auxiliary external devices) that are not set as the main connection target, the electronic device 100 refers to the connection history list 121 to determine whether it is time to allow communication with the terminals 500B, 500C (a period to enable communication). The CPU 11 may not receive advertisements from the terminals 500 in a case in which connection with all the terminals 500 as the main connection targets is established and the CPU 11 is in a state (period) not to allow (enable) communication with all the auxiliary terminals 500 which are not the main connection targets. In BLE communication, advertisements are transmitted and received on three specific channels. In the embodiment, the three channels are excluded from reception targets so that the electronic device 100 does not receive advertisements from the terminals 500. In the meantime, the electronic device 100 does not determine whether to allow communication.

In a case in which the electronic device 100 needs to send particular information, e.g., latest date and time information, to the terminals 500, the electronic device 100 switches to a period to allow communication. Connection requests in response to advertisements are accepted. For example, in a case in which the terminals 500 maintains accurate date and time display by periodically and optionally obtaining the latest date and time information from the electronic device 100, if the terminals 500 remains incapable of receiving exact date and time from the electronic device 100, the terminals 500 cannot display the exact date and time. It is a problem. In that case, the electronic device 100 switches to accept connection requests from the auxiliary terminals 500, which are not the main connection target.

Time periods in which the electronic device 100 needs to transmit date and time occur in some cases, for example, a case in which a standard time passes after the last transmission, or a case in which the current date and time counted by the electronic device 100 itself is corrected (including change in the time zone, and start and end of daylight saving time, as described above). For example, in a case in which the time counted by the terminal 500 gains or loses a maximum of about 0.5 seconds in 24 hours, the standard time is set to 24 hours so as not to gain or lose 0.5 seconds or more.

As described above, the connection history list 121 stores the date and time collection flag and the date and time data of the latest connection time point. In the embodiment, the electronic device 100 switches to a period to allow communication in a case in which the date and time collection flag is set or in a case in which at least one day (standard time) passes after the latest connection time point, at which data of the current time was transmitted. The date and time collection flag may be set also when one day passes after the latest connection time point. In this case, whether to allow communication is determined based only on the date and time collection flag.

In that case, connection is cut off immediately after the date and time information is transmitted and received. When the terminal 500 acquires the date and time information and corrects date and time, the date and time collection flag of the terminal 500 is reset to become "0". The electronic device 100 switches to a period not to allow communication. The latest connection time point is updated so that the CPU 11 determines that it is not the time to allow communication.

Figure 5:
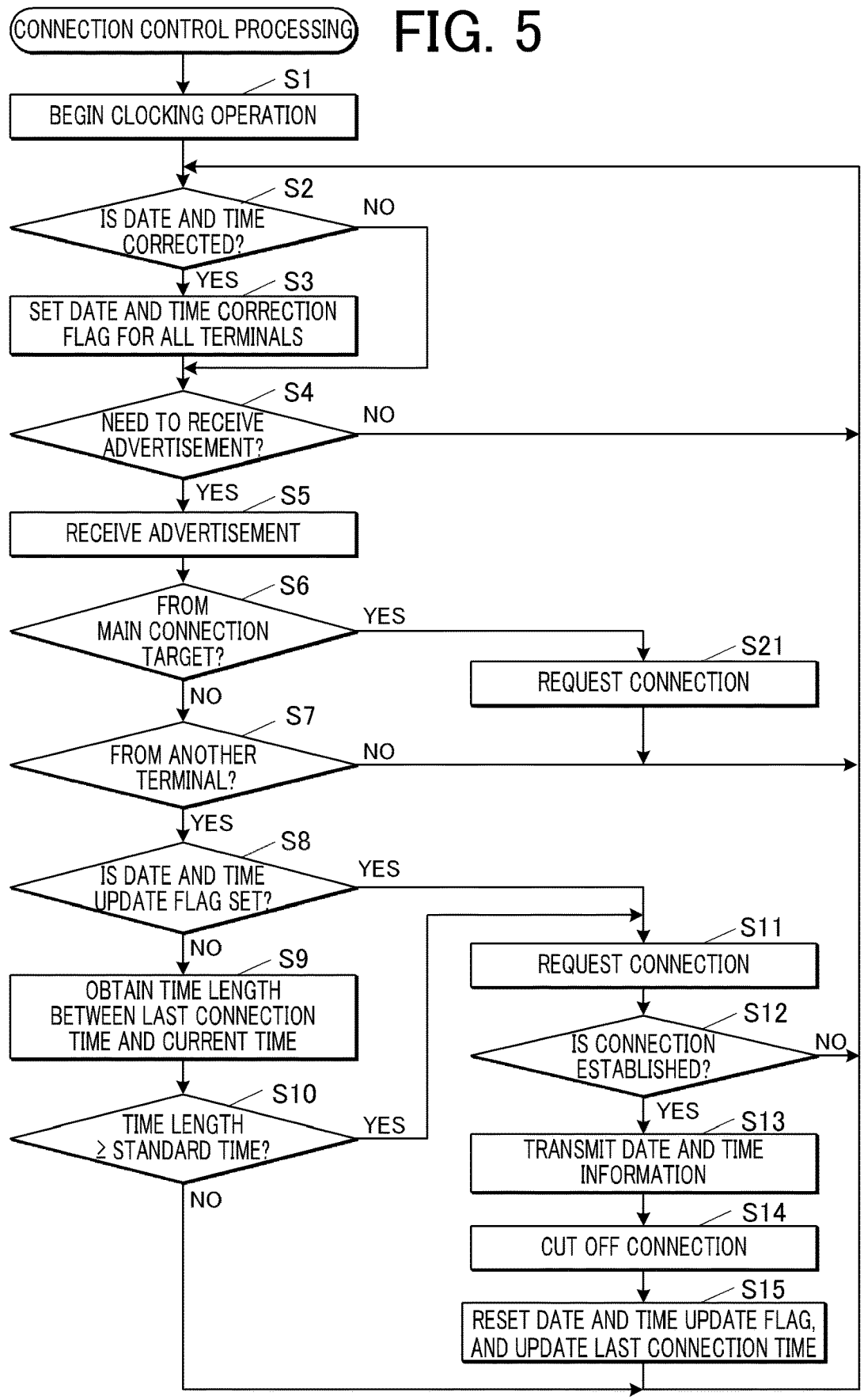
FIG. 5 is a flowchart illustrating control procedure in connection control processing performed by the electronic device.

FIG. 5 is a flowchart illustrating control procedure of the CPU 11 in connection control processing of the electronic device 100. The connection control processing begins in response to a start of the application 2211.

When connection control processing begins, the CPU 11 makes the timer processor 2211a begin a clocking operation (Step S1). The initial value of a date and time to be counted may be a date and time counted by the timer circuit 17. Alternatively, an exact date and time may be obtained quickly from an external time server or the like. The CPU 11 then obtains date and time data from the time server at appropriate intervals and/or as needed. The CPU 11 determines whether the current date and time being counted have been corrected (Step S2). In a case in which the CPU 11 determines that the current date and time have been corrected ("YES" in Step S2), the CPU 11 sets the date and time collection flags for all the terminals 500 to "1" at the same time, the terminals 500 being paired as communication partners via the application 2211. Then, processing of the CPU 11 proceeds to Step S4. In a case in which the CPU 11 determines that the present date and time have not been corrected ("NO" in Step S2), processing of the CPU 11 proceeds to Step S4.

When processing proceeds to Step S4, the CPU 11 determines whether the CPU 11 needs to receive an advertisement (Step S4).

As described above, the CPU 11 determines that the CPU 11 needs to receive an advertisement in:
 a case in which connection with the terminal 500 of the main connection target is not established;
 a case in which the date and time collection flag is set for one of the auxiliary terminals 500; and
 a case in which a time length between the last connection time point and the current date and time is more than or equal to the standard time in one of the auxiliary terminals 500.

In a case in which the CPU determines that the CPU 11 does not need to receive an advertisement ("NO" in Step S4), processing of the CPU 11 returns to Step S2.

In a case in which the CPU 11 determines that the CPU 11 needs to receive an advertisement ("YES" in Step S4), the CPU 11 receives the advertisement (Step S5). The CPU 11 determines whether the CPU 11 has received an advertisement from the terminal 500 of the main connection target (Step S6). Ina case in which the CPU 11 determines that the CPU 11 has received the advertisement from the terminal 500 of the main connection target ("YES" in Step S6), the CPU 11 transmits a connection request to the terminal 500 and establishes connection (Step S21). Then, processing of the CPU 11 returns to Step S2.

In a case in which the CPU 11 determines that the CPU has not received the advertisement from the terminal 500 of the main connection target ("NO" in Step S6), the CPU 11 determines whether the CPU 11 has received an advertisement from one of the auxiliary terminals 500 listed in the connection history list 121 (Step S7). In a case in which the CPU 11 determines that the CPU 11 has not received an advertisement from one of the auxiliary terminals 500 on the connection history list 121 ("NO" in Step S7), processing of the CPU 11 returns to Step S2.

In a case in which the CPU 11 determines that the CPU 11 has received an advertisement from one of the auxiliary terminals 500 on the connection history list 121 ("YES" in Step S7), the CPU 11 determines whether the date and time update flag is set for the auxiliary terminal 500 from which the CPU 11 has received the advertisement (Step S8). In a case in which the CPU 11 determines that the date and time update flag is set ("YES" in Step S8), processing of the CPU 11 proceeds to Step S11.

In a case in which the CPU 11 determines that the date and time update flag is not set ("NO" in Step S8), the CPU 11 calculates and acquires a time length between the time point of latest connection with the terminal 500 and the current date and time (Step S9). The CPU 11 determines whether the time length is more than or equal to the standard time (Step S10). In a case in which the CPU 11 determines that the time length is less than the standard time ("NO" in Step S10), processing of the CPU 11 returns to Step S2. In a case in which the CPU 11 determines that the time length is more than or equal to the standard time ("YES" in Step S10), processing of the CPU 11 proceeds to Step S11.

When processing of the CPU 11 proceeds to Step S11 from Step S8 or S10, the CPU 11 transmits a request for connection to the terminal 500 from which the CPU 11 has received the advertisement (Step S11). The CPU 11 performs processing for establishing connection. The CPU 11 determines whether the connection is established (Step S12). In a case in which the CPU 11 determines that the connection is not established ("NO" in Step S12), processing of the CPU 11 returns to Step S2.

In a case in which the CPU 11 determines that connection is established ("YES" in Step S12), the CPU 11 transmits the current date and time information to the terminal 500 (Step S13). After the CPU 11 receives notification confirming reception of the current date and time information from the terminal 500, the CPU 11 cuts off connection (Step S14). The CPU 11 resets the date and time update flag in the connection history list 121 and updates the latest connection time point (Step S15). Then, processing of the CPU 11 returns to Step S2.

Of the connection control processing described above, processing in Steps S7 to S10 corresponds to a setting of permission of connection in the connection control method according to the embodiment (a connection permission setting unit in the application 2211).

As described above, the electronic device 100, which is the communication device in the embodiment, includes:
the first communicator 211 that communicates with the terminals 500, which are external devices; and
the CPU 11 that controls connection.
While at least one terminal 500 is assigned to the main connection target, the CPU 11 switches between:
a period to allow communication with at least one of the auxiliary terminals 500 which are not the main connection target; and
a period not to allow communication with the at least one of the auxiliary terminals 500.
Thus, a period not to allow communication is set for the terminals 500 that do not require frequent connection such as always-on connection. It allows intermittent connection. As a result, power consumption associated with communication does not increase unnecessarily. Communication for necessary data is performed more efficiently. In recent years, some terminals are constantly connected with electronic devices in short-range wireless communication using Bluetooth or the like. It sometimes brings a problem that other terminals of low priority are not connected at all and necessary information is not transmitted. However, according to the embodiment, necessary communication is performed more efficiently.

The CPU 11 switches for permission of communication based on a set condition. Since the condition is set in advance, and switching for permission of communication is performed according to the condition, the control is simple.

In a case in which the CPU 11 needs to communicate with one of the auxiliary terminals 500, which are not the main connection target, for particular information, the CPU 11 switches to a period to allow communication. That is, communication is allowed only in a case in which the electronic device 100 determines that it needs to communicate. Unnecessary communication is not performed. Therefore, power consumption of the electronic device 100 and the terminals 500 does not increase unnecessarily.

After the CPU 11 communicates with the auxiliary terminal 500, which is not the main connection target, for the particular information within the time period to allow communication, the CPU 11 cuts off connection with the auxiliary terminal 500. Thus, connection is cut off immediately after necessary information is transmitted and received. Connection is not unnecessarily kept, and power consumption for connection is reduced.

After the CPU 11 communicates with the auxiliary terminal 500 for the particular information, the CPU 11 switches to a period not to allow communication in relation to the auxiliary terminal 500. Thus, after communication for necessary data is completed, the CPU 11 switches to a state in which communication is not allowed. The CPU 11 does not make unnecessary connection until communication is required again. Therefore, power consumption of the electronic device 100 and the terminals 500 does not increase unnecessarily. Only necessary communication is performed to improve efficiency.

The CPU 11 controls connection with a plurality of auxiliary terminals 500. After the CPU 11 communicates with a first auxiliary terminal 500 among the auxiliary terminals 500 for the particular information, the CPU 11 switches to a period not to allow communication in relation to the first auxiliary terminal 500. The CPU 11 maintains a period to allow communication in relation to the auxiliary terminals 500 other than the first auxiliary terminal 500.

Thus, in a case in which the CPU 11 needs to transmit and receive necessary information with a plurality of auxiliary terminals 500, every time the CPU 11 transmits and receives necessary information, the CPU 11 switches to a period not to allow communication in relation to the auxiliary terminal 500 to/from which the CPU 11 has transmitted or received the information. Therefore, after the necessary information is transmitted and received, the CPU 11 does not perform unnecessary communication. On the other hand, the CPU 11 maintains a period to allow communication in relation to the auxiliary terminals 500 to/from which the CPU 11 has not transmitted or received the information. Thus, necessary information is transmitted and received reliably and efficiently.

The electronic device 100 includes the timer processor 2211a that counts the current date and time. When the current date and time counted by the timer processor 2211a is corrected, the CPU 11 switches to a period to allow communication for the corrected current date and time as the particular information. That is, the electronic device 100 transmits the accurate current date and time information to the terminals 500. This minimizes communication between the electronic device 100 and the terminals 500 while the current date and time counted by each of the terminals 500 are kept correct.

The current date and time is local time in the time zone corresponding to a current location of the electronic device 100. Correction in the current date and time may include change in the time zone, and start and end of daylight saving time for local time. In that case, the terminal 500 does not have to manage local time information. Accurate counting and display of local time is easily maintained.

When a predetermined standard time, for example, one day passes after the CPU 11 sends the current date and time data to the terminals 500, the CPU 11 switches to a period to allow communication for the current date and time data as the particular information. Thus, the current date and time counted by the terminals 500 can be modified almost once in the standard time. Therefore, even if accuracy of the oscillator circuit or the like, on which the current date and time counted in the terminal 500 is based, is somewhat lower, gain and loss in the current date and time is kept within an appropriate range. The exact current date and time are counted and displayed.

The connection control method according to the embodiment includes a setting for permission of communication.

According to the setting, while at least one terminal 500 is defined as the main connection target, the CPU 11 switches between:

a period to allow communication with at least one of the auxiliary terminals 500, which are not the main connection target; and a period not to allow communication with the at least one of the auxiliary terminals 500.

With such connection control, power consumption of the terminals 500 that do not require frequent connection such as always-on connection does not increase unnecessarily. Communication for necessary data is performed more efficiently.

The application 2211 as software executes and controls the connection control method. The application 2211 is installed, and the CPU 11 activates it. Thus, no special hardware or the like is required.

Communication for necessary data is performed easily and more efficiently between the electronic device 100 and the terminals 500.

The present invention is not limited to the above embodiment and may be modified in various ways.

For example, in the above embodiment, the current date and time data is transmitted at a frequency of once a day. The frequency is not limited to this. The frequency may be determined in accordance with accuracy of the oscillator circuit of the terminal 500, accuracy of the date and time display required for the terminal 500, and the like. In a case in which there are multiple auxiliary terminals 500, which are not the main connection target, a frequency at which communication is allowed may be different between some of the auxiliary terminals 500 and others.

In the above embodiment, whether to allow communication is determined in accordance with a need to transmit the current date and time data. The particular information is not limited to this. For example, an alarm notification command or the like may be sent to the auxiliary terminals 500, which are not the main connection target, or to all the terminals 500 to make the connected terminals 500 notify an alarm.

In that case, connection may be made regardless of whether the electronic device 100 is in a period to allow communication or not.

Alternatively, whether to allow communication may be determined in accordance with not a need to transmit data from the electronic device 100 but a need to receive data from the terminals 500. For example, control of a communication time for obtaining data measured by the terminal 500 may be performed in the same manner once a day and when necessary.

In the above embodiment, connection is cut off immediately after the current date and time data is transmitted and received. However, if there are other data that may be transmitted and received at any time point, these data may be transmitted and received together with the current date and time data.

A lower limit of connection frequency may be determined in a case in which a frequency of connection for the particular information is low. In that case, even when the electronic device 100 does not need to communicate for the particular information, the electronic device 100 is connected at connection frequency of the lower limit. An upper limit of a connection period in such connection, which might be unnecessary, may be determined. If there is no connection within the connection period of the upper limit, connection may be cut off.

In the above embodiment, BLE is given as an example of a communication standard, and BC is also given as an alternative communication standard. However, the communication standard is not limited to such Bluetooth. Connection in other communication standards, e.g., connection through a wireless LAN, may also be allowed.

In the above embodiment, the number of the terminals 500 of the main connection target can be plural. In a case in which the number of terminals 500 of the main connection target is limited to one, whether the terminal 500 is the main connection target or not does not has to be set for each of the terminals 500. If the terminal 500 of one main connection target is identified, it is sufficient.

In the above embodiment, the electronic device 100 is a smartphone. However, the electronic device 100 is not limited to this, and may be other portable electronic terminals such as a laptop.

In the above explanation, the memory 22 having a non-volatile memory is exemplified as a computer readable medium that stores the application 2211, which is a program for connection control processing by the CPU 11 according to the invention. However, the computer-readable medium is not limited to this, and may be an HDD (hard disk drive) or a portable recording medium such as a CD-ROM or a DVD. A carrier wave may be adopted as a medium that provides data of a program according to the invention through a communication line.

Although embodiments of the present invention have been described and illustrated in detail, the disclosed embodiments are made for purposes of illustration and example only and not limitation. The scope of the present invention should be interpreted by terms of the appended claims.

What is claimed is:

1. A communication device comprising:
   a processor for controlling connection to a plurality of external devices, wherein the processor is configured to, while at least one of the plurality of external devices is set as a main external device,
   switch between:

a first period to allow communication via a communicator with at least one of the plurality of external devices set as an auxiliary external device which is not the main external device; and a second period not to allow communication via the communicator with the auxiliary external device; and allow communication via the communicator with the main external device during the first period and the second period.

2. The communication device according to claim 1, wherein the processor is configured to switch between the first period and the second period based on a set condition.

3. The communication device according to claim 2, wherein the processor is configured to switch to the first period when the processor needs to communicate with the auxiliary external device for particular information.

4. The communication device according to claim 3, wherein, the processor is configured to cut off connection with the auxiliary external device after the communication device communicates with the auxiliary external device for particular information in the first period.

5. The communication device according to claim 3, wherein the processor is configured to switch to the second period after the communication device communicates with the auxiliary external device for the particular information.

6. The communication device according to claim 5, wherein the processor is configured to, after the communicator communicates with a first auxiliary external device among the plurality of external devices for the particular information, switch to the second period in relation to the first auxiliary external device while maintaining the first period in relation to the plurality of external devices other than the first auxiliary external device.

7. The communication device according to claim 3, wherein the processor is configured to:
   count a current time; and
   switch to the first period for a corrected current time as particular information when a standard time passes after the communication device transmits data of the current time to the auxiliary external device.

8. The communication device according to claim 1, wherein the processor is configured to:
   count a current time that is a local time in a time zone corresponding to a current position of the communication device;
   switch to the first period when the current time is corrected; and
   perform correction of the current time, the correction including changing the time zone and start and end of daylight saving time in the local time.

9. A connection control method for controlling connection to a plurality of external devices, the connection control method comprising, while at least one of the plurality of external devices is set as a main external device:
   switching between:
      a first period to allow communication via a communicator with at least one of the plurality of external devices set as an auxiliary external device which is not the main external device; and a second period not to allow communication via the communicator with the auxiliary external device; and allowing communication via the communicator with the main external device during the first period and the second period.

10. The connection control method according to claim 9, wherein the switching between the first period and the second period is based on a set condition.

11. The connection control method according to claim 10, wherein switching to the first period is performed when communication with the auxiliary external device for particular information is needed.

12. The connection control method according to claim 11, further comprising:
   cutting off connection with the auxiliary external device after the communication device communicates with the auxiliary external device for particular information in the first period.

13. The connection control method according to claim 11, wherein switching to the second period is performed after the communication device communicates with the auxiliary external device for the particular information.

14. The connection control method according to claim 13, wherein, after the communicator communicates with a first auxiliary external device among the plurality of external devices for the particular information, switching to the second period in relation to the first auxiliary external device while the first period is maintained in relation to the plurality of external devices other than the first auxiliary external device.

15. The connection control method according to claim 11, further comprising:
   counting a current time; and
   switching to the first period for a corrected current time as particular information when a standard time passes after transmitting data of the current time to the auxiliary external device.

16. The connection control method according to claim 9, further comprising:
   counting a current time that is a local time in a time zone corresponding to a current position of the communication device;
   switching to the first period when the current time is corrected; and
   performing correction of the current time, the correction including changing the time zone and start and end of daylight saving time in the local time.

17. A non-transitory computer-readable medium storing a program for controlling connection to a plurality of external devices, wherein the program makes a computer at least perform, while at least one of the plurality of external devices is set as a main external device:
   switching between:
      a first period to allow communication via a communicator with at least one of the plurality of external devices set as an auxiliary external device which is not the main external device, and
      a second period not to allow communication via the communicator with the auxiliary external device; and
   allowing communication via the communicator with the main external device during the first period and the second period.

* * * * *